United States Patent
Narayanan et al.

(10) Patent No.: US 7,520,124 B2
(45) Date of Patent: Apr. 21, 2009

(54) ASYMMETRIC SERRATED NOZZLE FOR EXHAUST NOISE REDUCTION

(75) Inventors: Satish Narayanan, Ellington, CT (US); John Simonich, Glastonbury, CT (US); Robert Hans Schlinker, Canton, CT (US)

(73) Assignee: United Technologies Corporation, Hartford, CT (US)

( * ) Notice: Subject to any disclaimer, the term of this patent is extended or adjusted under 35 U.S.C. 154(b) by 254 days.

(21) Appl. No.: 11/519,606

(22) Filed: Sep. 12, 2006

(65) Prior Publication Data

US 2008/0060343 A1 Mar. 13, 2008

(51) Int. Cl.
*F02K 1/38* (2006.01)
(52) U.S. Cl. .................... 60/262; 60/226.1; 60/770; 239/265.25; 239/265.27; 239/265.37
(58) Field of Classification Search ............ 60/262, 60/770, 180, 204, 265.25, 265.27, 265.37; 181/212
See application file for complete search history.

(56) References Cited

U.S. PATENT DOCUMENTS

| | | | |
|---|---|---|---|
| 3,153,319 A | 10/1964 | Young et al. | |
| 3,215,172 A | 11/1965 | Ardoin | |
| 3,568,792 A | 3/1971 | Urquhart | |
| 3,648,800 A | 3/1972 | Hoerst | |
| 4,149,375 A | 4/1979 | Wynosky et al. | |
| 4,282,170 A * | 8/1981 | Lavagnino et al. | 558/427 |
| 4,284,170 A | 8/1981 | Larson et al. | |
| 4,311,291 A | 1/1982 | Gilbertson et al. | |
| 6,314,721 B1 | 11/2001 | Mathews et al. | |
| 6,360,528 B1 | 3/2002 | Brausch et al. | |
| 6,487,848 B2 | 12/2002 | Zysman et al. | |
| 6,502,383 B1 | 1/2003 | Janardan et al. | |
| 6,532,729 B2 | 3/2003 | Martens | |
| 6,969,028 B2 | 11/2005 | Dun | |
| 6,971,240 B2 | 12/2005 | Wollenweber | |
| 7,000,378 B2 | 2/2006 | Birch et al. | |
| 2005/0166575 A1 * | 8/2005 | Birch et al. | 60/226.1 |
| 2005/0193716 A1 | 9/2005 | Schlinker et al. | |
| 2005/0214107 A1 * | 9/2005 | Gutmark et al. | 415/1 |

OTHER PUBLICATIONS

Article by Mengle, et al., "Reducing Propulsion Airframe Aeroacoustic Interactions with Uniquely Tailored Chevrons: 1. Isolated Nozzles", May 2006, pp. 1-18.

(Continued)

*Primary Examiner*—Michael Cuff
*Assistant Examiner*—Phutthiwat Wongwian
(74) *Attorney, Agent, or Firm*—Kinney & Lange, P.A.

(57) ABSTRACT

An exhaust nozzle for use in a gas turbine engine comprises a flow body for receiving exhaust gas from the turbine engine and includes a leading edge and a trailing edge. The leading edge connects with the gas turbine engine such that the flow body surrounds a centerline of the engine. The trailing edge comprises a serrated portion and a non-serrated portion. The serrated portion is formed from a plurality of tabs for mixing exhaust gas exiting the flow body with gases passing by an exterior of the flow body. The non-serrated portion is positioned along a lower portion of the trailing edge with respect to the engine centerline.

17 Claims, 5 Drawing Sheets

OTHER PUBLICATIONS

Article by Mengle, et al., "Reducing Propulsion Airframe Aeroacoustic Interactions with Uniquely Tailored Chevrons: 2. Installed Nozzles", May 2006, pp. 1-14.

Article by Mengle, et al., "Reducing Propulsion Airframe Aeroacoustic Interactions with Uniquely Tailored Chevrons: 3. Jet-Flap Interaction", May 2006, pp. 1-15.

Article by Nesbitt, et al., "Flight Test Results for Uniquely Tailored Propulsion-Airframe Aeroacoustic Chevrons: Community Noise", May 2006, pp. 1-13.

Article by Mengle, et al., "Flight Test Results for Uniquely Tailored Propulsion-Airframe Aeroacoustic Chevrons: Shockcell Noise", May 2006, pp. 1-17.

* cited by examiner

ASYMMETRIC SERRATED NOZZLE FOR EXHAUST NOISE REDUCTION

BACKGROUND OF THE INVENTION

This invention relates generally to gas turbine engines and more particularly to exhaust nozzles having noise reduction features. In gas turbine engines, thrust is produced by imparting a large acceleration to a small mass of high-energy gas, thereby creating forward momentum of the engine. This is chiefly accomplished by combusting fuel in a stream of compressed core air, which is then passed through one or more turbines and out an exhaust nozzle. One turbine typically drives a compressor for producing the high-energy gas. The exhaust nozzle further increases the acceleration of the gas. A second turbine may also be used to power a turbofan for imparting acceleration to a secondary stream of air, typically concentric with the core airflow, that is also passed through an exhaust nozzle. The two streams of air mix with each other and with ambient air streams as they exit the engine from their respective exhaust nozzles.

A primary source of jet engine noise is the shear region of the exhausted air streams, where different high-velocity air streams mix with each other and the slower moving ambient air. Especially in turbofan engines, where the secondary air stream exits the engine at approximately 1000 ft/sec and the core air stream exits the engine at approximately 1600 ft/sec, the mixing of the different velocity air streams produces a great deal of turbulence and associated noise, particularly low-frequency noise.

Due, in part, to standards developed by various air transportation industries and government bodies, efforts have been made to reduce the overall noise production of aircraft for various purposes including improving quality of life near airports. The noise produced at the exhaust nozzles has long been known to be a major source of aircraft noise, and various attempts have been made to reduce exhaust gas noise, particularly the low-frequency noise. For example, various noise reduction systems employ tabs along the downstream perimeter of exhaust nozzles to produce smoother mixing of the various velocity air streams, thereby reducing the levels of noisy shear flows. These systems, however, achieve low-frequency noise reduction at a penalty to high-frequency noise and thrust production. Therefore, it would be desirable to have an exhaust nozzle with improved noise reduction characteristics, while also reducing associated thrust loses.

BRIEF SUMMARY OF THE INVENTION

The present invention is directed toward an exhaust nozzle for a gas turbine engine. The exhaust nozzle comprises a flow body for receiving exhaust gas from the turbine engine and includes a leading edge and a trailing edge. The leading edge connects with the gas turbine engine such that the flow body surrounds a centerline of the engine. The trailing edge comprises a serrated portion and a non-serrated portion. The serrated portion is formed from a plurality of tabs for mixing exhaust gas exiting the flow body with gases passing by an exterior of the flow body. The non-serrated portion is positioned along a lower portion of the trailing edge with respect to the engine centerline.

DETAILED DESCRIPTION

Figure 1:
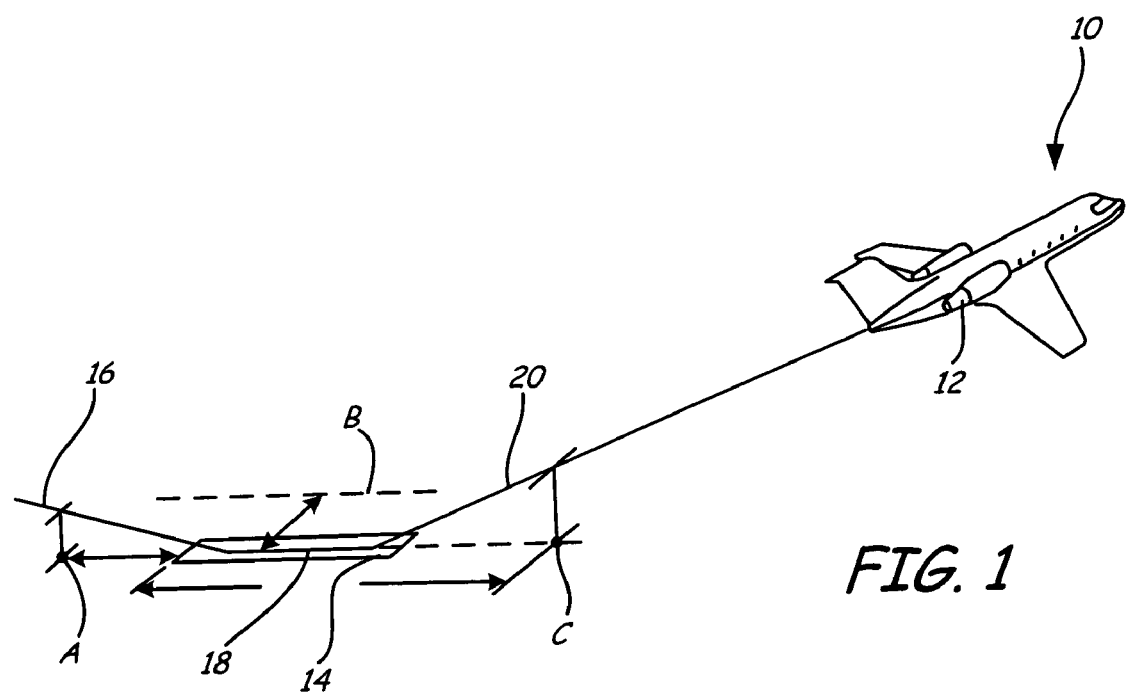
FIG. 1 shows a jet aircraft, including an exhaust nozzle of the present invention, operating with respect to a ground-based runway.

FIG. 1 shows aircraft 10 having gas turbine engine 12 including an exhaust nozzle of the present invention. Aircraft 10 is depicted as operating with respect to ground-based runway 14. During typical airport operations, aircraft 10 engages in approach (represented by line 16), landing/take-off (line 18) and ascent (line 20) operations in conjunction with runway 14. For take-off and ascent operations, aircraft 10 typically requires the most amount of thrust, and correspondingly produces the most amount of noise during these operations. Noise produced by aircraft 10 is bothersome and disruptive to persons living and working near runway 14, such as at points A, B, and C. Aircraft noise is, therefore, particularly disruptive at points A, B and C due to their proximity to aircraft engaged in landing and take-off operations in conjunction with runway 14.

During testing to evaluate noise produced by aircraft 10, microphones are positioned at standardized test points from which acoustic sound and noise data can be collected. For example, microphones are positioned at points A, B and C to evaluate typical flight pattern operations near where people are most likely to be located. In one test, point A is typically two thousand meters from the beginning of runway 14 for aircraft approaching at a three-degree glide slope; point B is typically four hundred and fifty meters from the side of runway 14; and point C is typically sixty five hundred meters from the beginning of runway 14. In order to reduce the noise perceived at points A, B and C, as well as other locations, engine 12 of aircraft 10 includes an exhaust nozzle having a directionally oriented asymmetric exhaust nozzle according to the present invention.

Figure 2:
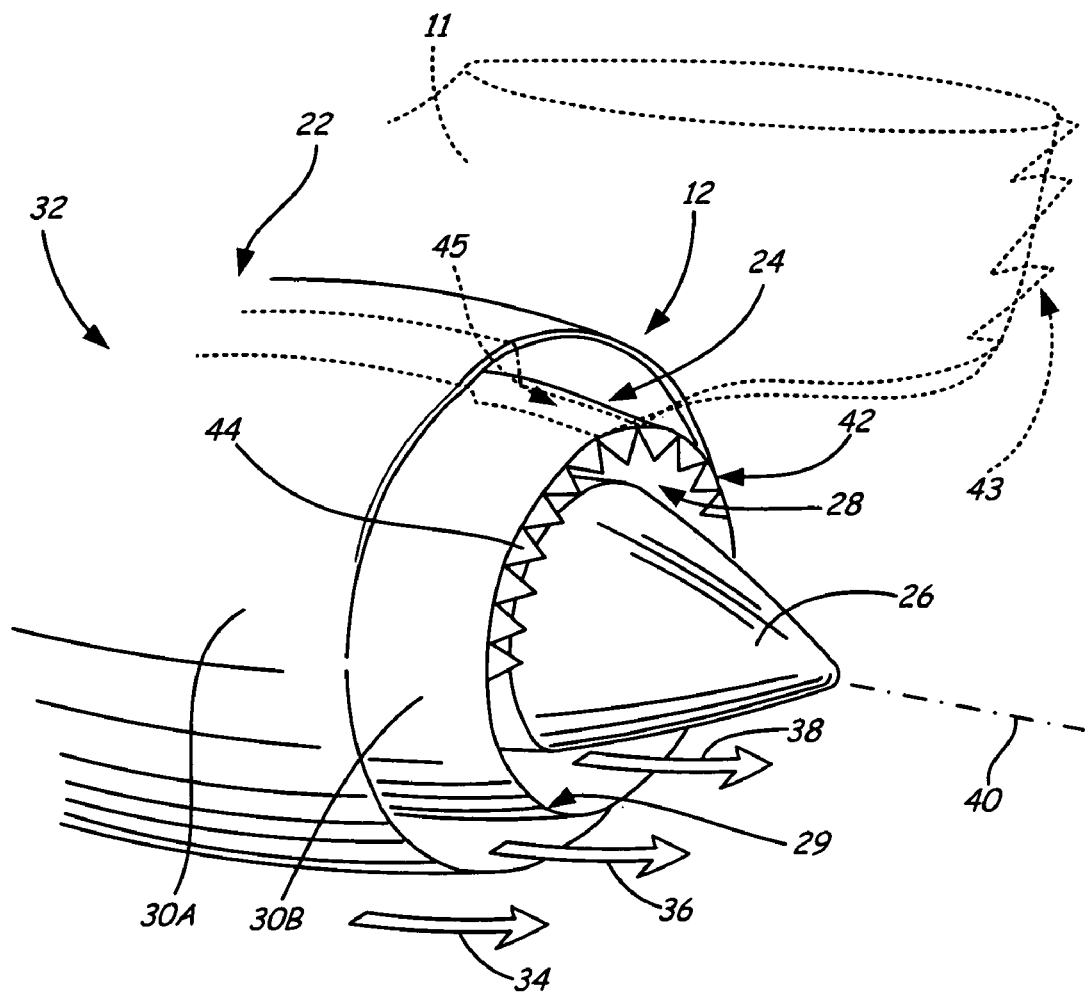
FIG. 2 is a perspective view of the downstream end of an engine of the aircraft of FIG. 1 including an exhaust nozzle of the present invention.

FIG. 2 shows gas turbine engine 12 of aircraft 10. Engine 12 is suspended from aircraft 10 by pylon 11, which is shown in phantom for clarity. Engine 12 includes outer nozzle 22, inner nozzle 24 and tail cone 26. Pylon 11 is joined with inner nozzle 24 and outer nozzle 22 is cutaway to accept pylon 11 near its trailing edge. Inner nozzle 24 is asymmetric in that it includes serrated portion 28 and non-serrated portion 29. Non-serrated portion 29 is aligned to reduce noise propagation in a selected direction and, in one embodiment, reduces noise propagation in a downward direction. In one embodiment of the present invention, engine 12 comprises a high to moderate bypass turbofan engine with separate flow exhaust, in which case outer nozzle 22 comprises a fan nozzle and inner nozzle 24 comprises a core nozzle. However, the present invention can also be used in other engine configurations, such as mixed flow or low bypass turbofan engines. Additionally, the present invention can be used in other types of gas turbine engines, such as in turbojets, or on other types of exhaust nozzles, such as axi-symmetrical, elliptical or rectangular.

Outer nozzle 22 and inner nozzle 24 comprise flow bodies 30A and 30B, which are connected at their leading edges 32 to engine 12, such as at a turbine exhaust case. Flow bodies 30A and 30B receive and direct various air and gas flows from and around engine 12. Ambient air 34 passes by engine 12 and outer nozzle 22 at velocities approximating the velocity of aircraft 10. After being accelerated by the turbofan of engine 12, fan exhaust air 36 is further accelerated by and expelled from outer nozzle 22. Similarly, after being accelerated by the combustion process in engine 12, core exhaust air 38 is further accelerated by and expelled from inner nozzle 24. Outer nozzle 22 and inner nozzle 24 are concentrically positioned around engine centerline 40. Engine centerline 40 typically comprises the center of the engine along which turbine/compressor shafts rotate and around which the various gas flows are directed. Thus, core exhaust air 38 exits inner nozzle 24 co-axially with centerline 40, and fan exhaust air 36 and ambient air 34 are concentric with core exhaust air 38. During typical flight operations, aircraft 10 operates such that the bottom of engine 12, including the bottoms of outer nozzle 22 and inner nozzle 24, are directed toward the ground, i.e. runway 14, with respect to centerline 40. As such, pylon 11 is typically directed upward toward the sky.

Outer nozzle 22 separates fan exhaust air 36 from ambient exhaust air 34, while inner nozzle 24 separates fan exhaust air 36 from core exhaust air 38. Tail cone 26 assists in smoothing and transitioning the exhaust flows, particularly core exhaust air 38, as they exit engine 12. As described above, fan exhaust air 36 typically travels at approximately 1000 ft/sec (~304.8 m/sec), and core exhaust air 38 typically travels at approximately 1600 ft/sec (~487.7 m/sec). Aircraft 10 can fly at speeds as low as about 300 mph (~482.8 kph), thus resulting in ambient air 34 flowing past outer nozzle 22 at speeds of approximately 400 ft/sec (~121.9 m/sec). The disparity in flow velocities of the air streams generates a volume of low and high frequency noise associated with shearing during mixing of the flows. In order to reduce the amount of noise produced by the mixing and shearing of the air streams, engine 12 is provided with serrated portion 28 and non-serrated portion 29 at its trailing edge periphery 42. Particularly, non-serrated portion 29 is positioned along a lower portion of the trailing edge to reduce noise propagation in the downward direction. Pylon 11 also includes serrations 43 along its trailing edge for additionally reducing noise from aircraft 10.

Serration 28 comprises a plurality of mixing tabs 44 arcuately arranged around the downstream periphery or trailing edge of inner exhaust nozzle 24. Serration 28 comprises only a portion of the trailing edge such that untabbed or non-serrated portion 29 of the trailing edge remains. In other embodiments, engine 12 comprises an additional serration on outer nozzle 22. In still other embodiments, engine 12 comprises a serration on both inner nozzle 24 and outer nozzle 22. Mixing tabs 44 assist in smoothing the transition from several different velocity air flows to a single unified air flow. The mixing tabs produce vortices of air between the air streams on either side of nozzle 24, thus reducing the amount of shear and noise produced by the mixing exhaust gases. Mixing tabs 44 introduce a streamwise component of vorticity in core exhaust gas 38 by reorienting azimuthal vorticity. The steamwise vorticity introduces radial motion in the downstream exhaust flows, promoting entrainment and mixing of low-momentum fan exhaust air 36 into the high-speed core exhaust gas 38. This disrupts and attenuates large-scale turbulence in the exhaust gases, reducing low-frequency noise emissions. Likewise, in embodiments having a serration on outer nozzle 22, mixing tabs introduce a streamwise component of vorticity in fan exhaust gas 36 to promote entrainment and mixing of lower-momentum ambient air 34 into the higher-speed fan exhaust gas 36. Serration 43 of pylon 11 perform a similar function in reducing air stream mixing noise generated at pylon 11. The tabs of serration 43 can be alternately arranged on the aircraft side and exposed side of pylon 11 such that turbulence and drag are somewhat equally distributed downstream of pylon 11. In other embodiments of the present invention, a small portion of mixing tabs 44 can be removed from around an upper portion of inner nozzle 24 directly below pylon 11, such as indicated by arrow 45, to reduce airframe noise generated by pylon 11. Thus, in combination with serration 43, the absence of mixing tabs 44 at arrow 45 reduces airframe and air stream related noise generated by pylon 11. However, in order to reduce noise generation and propagation in a direction away from pylon 11, such as in a downward direction where people on the ground are located, non-serrated portion 29 is positioned on a lower portion of nozzle 24.

In typical embodiments, mixing tabs 44 project generally downstream from the downstream face of nozzle 24 such that the widest portion of each mixing tab, or its base, is generally planar with the downstream face of non-serrated portion 29. However, mixing tabs 44 can be configured in any number of ways. For example, mixing tabs can have different sizes or shapes, such as triangular or trapezoidal. Mixing tabs can be curved inward toward the engine centerline and/or circumferentially around the engine centerline.

In previous implementations of mixing tabs on exhaust nozzles, the mixing tabs are symmetrically distributed around the entirety of the trailing edge periphery of the exhaust nozzle to form a serration, typically in two configurations. In one configuration, mixing tabs are placed continuously around the downstream periphery of the exhaust nozzle such that the serration is made up of a continuous row of tabs encircling the entire periphery, i.e. the bases of each tab connect. In another configuration, however, the tabs form a discontinuous row such that the serration includes an equal spacing between each tab around the entire periphery. In yet other designs of the prior art, a small portion of the serration can be removed from around an upper portion of an exhaust nozzle directly below a pylon to reduce airframe noise generated by exhaust gas interaction with the pylon. In any event, mixing tabs reduce the total noise production of engines by shifting the noise frequency spectrum of the mixing exhaust gases to higher frequencies such that low-frequency noise production decreases in an amount greater than high-frequency noise production increases. There are several advantages in shifting the noise spectrum to the high frequency band. For example, higher frequency noise is not perceptible to human hearing. Also, high-frequency noise is more readily attenuated by both the atmosphere and physical obstructions.

Figure 3:
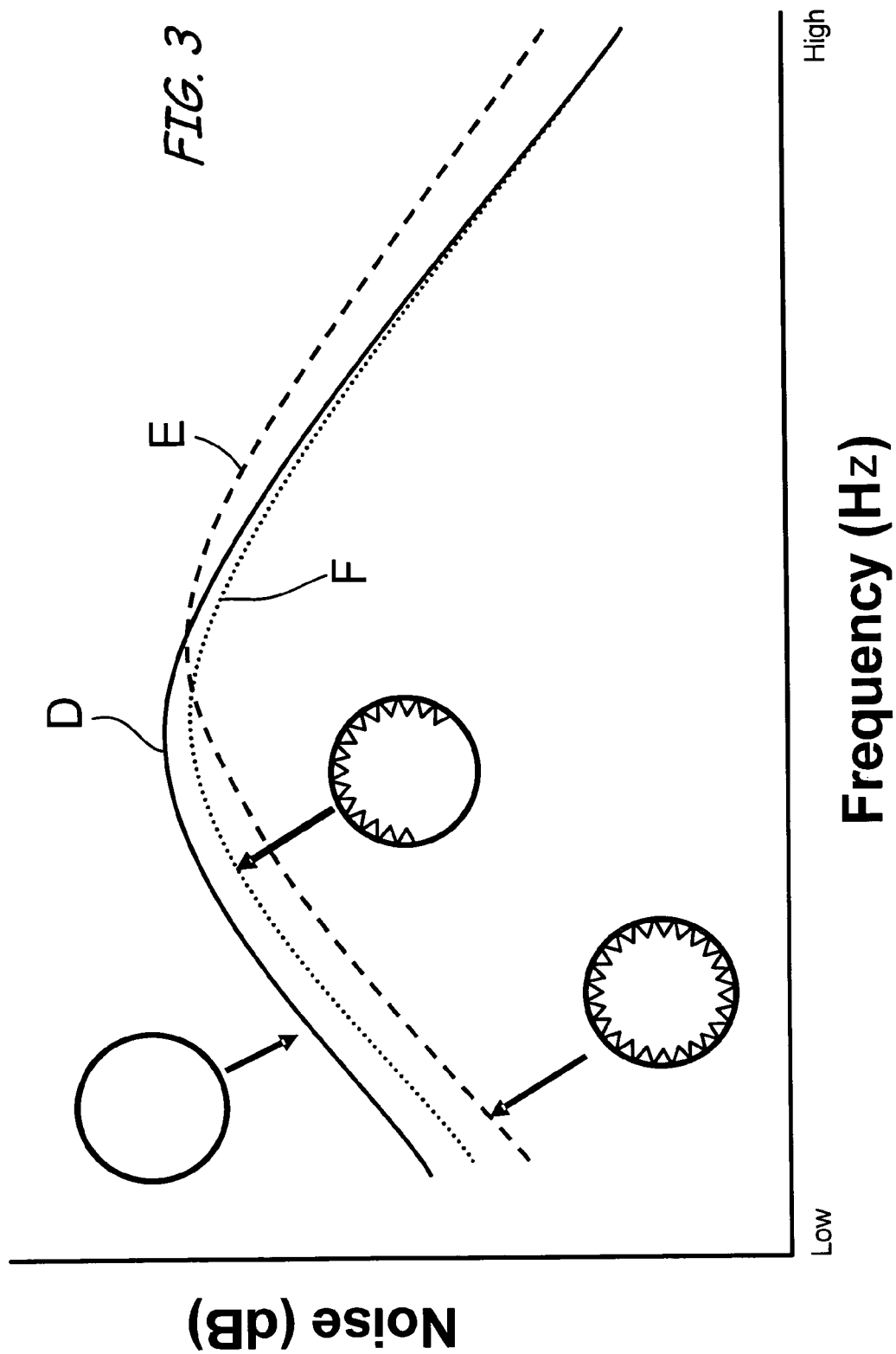
FIG. 3 is a graph showing far-field noise levels for different exhaust nozzle configurations.

FIG. 3 is a graph showing noise level versus frequency for different exhaust nozzle configurations. FIG. 3 shows expected results based on data collected from scale-model testing of exhaust nozzles. During the tests used to produce FIG. 3, noise levels were monitored at a location near the scale exhaust nozzles such that continuous noise produced by the exhaust gases would be detected in the exhaust gas plume. Decibel levels are shown for three different exhaust nozzle configurations: a completely untabbed exhaust nozzle; a fully tabbed exhaust nozzle (representative of the prior art); and a partially tabbed, partially untabbed exhaust nozzle (representative of the present invention).

Solid line D represents a decibel curve for the exhaust nozzle having no mixing tabs. The low-frequency noise levels contribute a substantial portion of total noise signature, which, as described above, is particularly troublesome to surrounding communities since low-frequency noise is not easily attenuated.

Dashed line E represents a decibel curve for the exhaust nozzle having a serration along the entire downstream periphery of the nozzle. The curve indicates a decrease in decibel levels at the low end of the frequency spectrum as compared to the non-serrated exhaust nozzle. At the high end of the frequency spectrum the decibel level increases. The increase in high-frequency noise, however, is less than the decrease in low-frequency noise such that the total noise level decreases as compared to the non-serrated exhaust nozzle. Thus, a fully tabbed or fully serrated exhaust nozzle achieves a reduction in total noise production with a penalty to high-frequency noise.

A decibel curve representative of an exhaust nozzle of the present invention, such as that of FIG. 2, is shown with dotted line F. The present invention alleviates the noise reduction losses to high-frequency noise production by selectively sizing and placing a non-serrated or continuously untabbed portion along the trailing edge of the exhaust nozzle, thus interrupting the continuity of the serration, in a direction where noise reduction is desired. For example, in the exhaust nozzle of FIG. 2, serration 28 comprises a substantially tabbed portion of the downstream periphery of inner exhaust nozzle 24 that is arranged along an upper portion of the periphery. Thus, serration 28 leaves substantially untabbed portion 29 on the downstream periphery of inner exhaust nozzle 24 arranged along a lower portion of the periphery. With such an arrangement, inner exhaust nozzle 24 achieves a reduction in low-frequency noise with a reduction in parasitic high-frequency noise production in a desired, e.g. downward, direction.

The data in FIG. 3 was generated with the serrated portion directed away from the microphone used to detect the noise, such that the non-serrated portion is directed toward the microphone. At the low-frequency level, dotted line F is below solid line A, indicating a reduction in low-frequency noise production as compared to a completely untabbed or unserrated nozzle. Also at the low-frequency level, dotted line F is above dashed line E, indicating a smaller drop in low-frequency noise reduction as compared to a fully tabbed exhaust nozzle. However, as dotted line F continues into the high-frequency spectrum, it continuously remains beneath solid line D, while dashed line E crosses over and above solid line D in the high-frequency spectrum. The amount of noise reduction for various frequencies depends on the configuration of the serrated portion. Thus, the present invention achieves an overall reduction in noise, as compared to the non-serrated nozzle, by reducing noise produced across the entire frequency spectrum. The present invention, however, achieves additional significant benefits, including advantages over the prior art, when perceived noise level, e.g. far-field noise from a ground-based microphone from an airborne aircraft, is examined.

Figure 4:
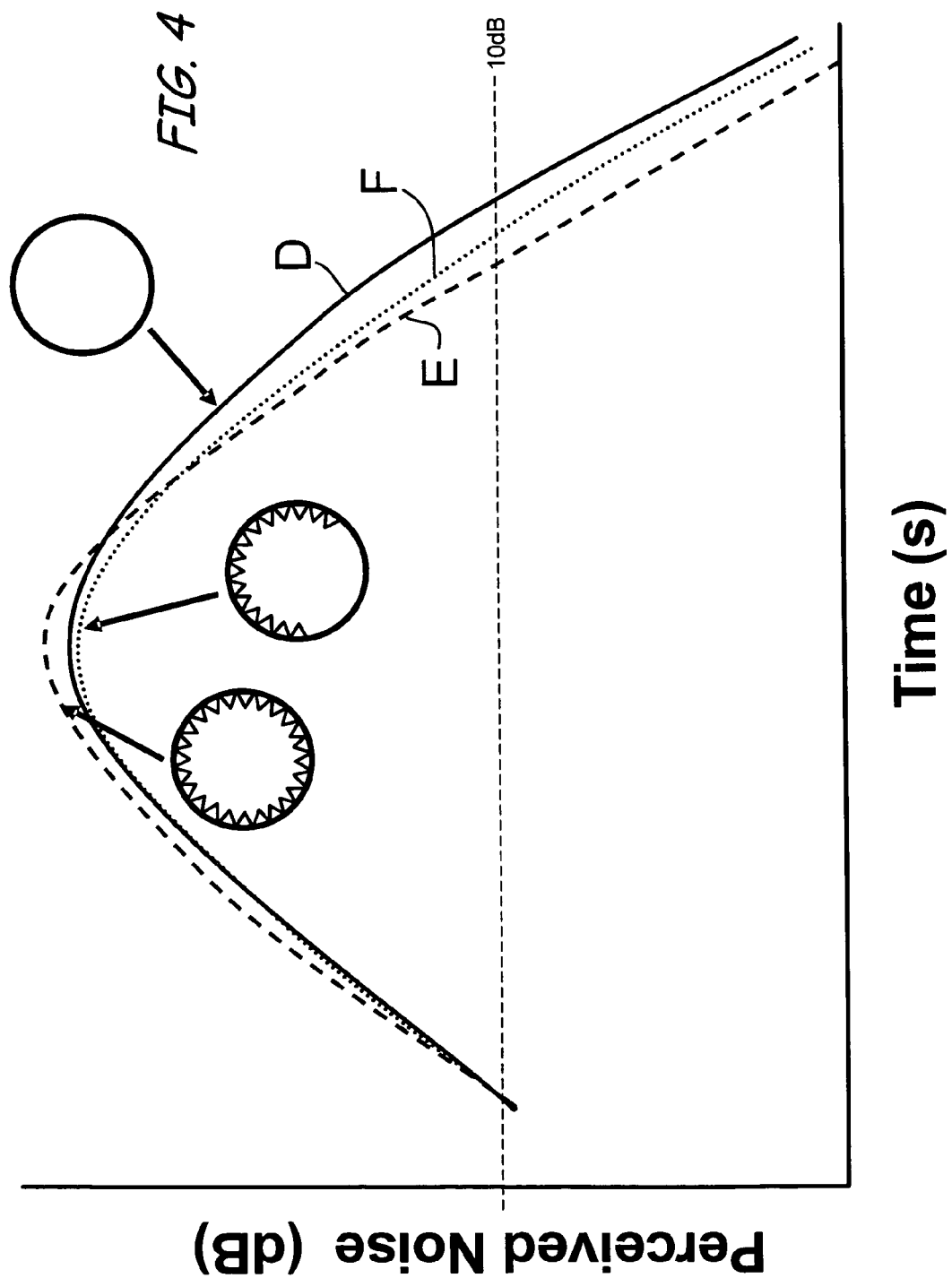
FIG. 4 is a graph showing perceived far-field noise levels for different exhaust nozzle configurations.

FIG. 4 shows simulated decibel levels for an airborne aircraft passing by a ground-based point location such that far field noise levels of the exhaust gas plume are indicated. FIG. 4 was produced with data derived from scale model testing, such as testing conducted in conjunction with producing FIG. 3. Thus, for example, FIG. 4 simulates data that would be collected at point A, B or C from FIG. 1, as aircraft 10 passes by during typical flight operations. For typical aircraft sound testing, such as in the tests described above, aircraft are evaluated by their total noise signature as perceived from a ground-based point location. With respect to FIG. 4, the relevant portion of the noise signature is represented by the area below each curve down to the 10 dB level.

FIG. 4 includes data for three different exhaust nozzle configurations: a completely untabbed exhaust nozzle; a fully tabbed exhaust nozzle (representative of the prior art); and a partially tabbed, partially untabbed exhaust nozzle (representative of the present invention). Solid line D represents a decibel curve for the exhaust nozzle having no mixing tabs. Solid line D shows a baseline curve for an aircraft approaching a point location, e.g. a microphone at point A, B or C. As the aircraft approaches (as you move left to right along the x-axis), perceived noise increases until it peaks when the aircraft is closest to the point location, and then decreases as the aircraft moves away.

Dashed line E represents a decibel curve for the exhaust nozzle having a serration along the entire downstream periphery of the nozzle. Due to the high-frequency byproduct of the mixing tabs, dashed line E has a significantly higher peak decibel level. However, since the mixing tabs reduce the low-frequency noise, dashed line E proceeds to flow under solid line D as the aircraft passes by, resulting in a total reduction in perceived noise. In other words, the area under dashed line E is less than the area under solid line D.

A decibel curve for one embodiment of an exhaust nozzle of the present invention is shown with dotted line F. Dotted line F represents positioning of the non-serrated portion in a direction of the test microphone such that the test simulates overhead flight of an aircraft having a significantly serrated portion directed upward, such as toward a pylon, and a significantly non-serrated portion directed downward, such as toward the ground. Dotted line F indicates that the present invention produces a lower peak decibel level and lower decibel levels as the aircraft passes by, resulting in an overall reduction in noise level as compared to both the non-serrated and completely serrated exhaust nozzles. Particularly, the exhaust nozzle of the present invention reduces the impact of high-frequency noise on the peak decibel levels and the impact of low-frequency noise on noise levels after the aircraft passes by. Experiments have shown, for one embodiment of the invention in which approximately one half of the downstream periphery is non-serrated, a reduction of about 1-2 dB in the peak decibel level in far-field noise measurements. Thus, the downward facing, non-serrated portion of the trailing edge of the present invention provides lower perceived noise levels in a selectively determined direction. In other words, the total area under dotted line F down to the ten dB level is less than the areas under both solid line D and dashed line E.

Figure 5A:
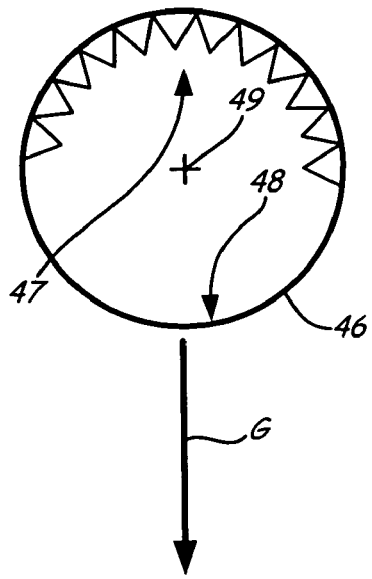
FIGS. 5A-5D show front views of various embodiments of an exhaust nozzle of the present invention.
Figure 5D:
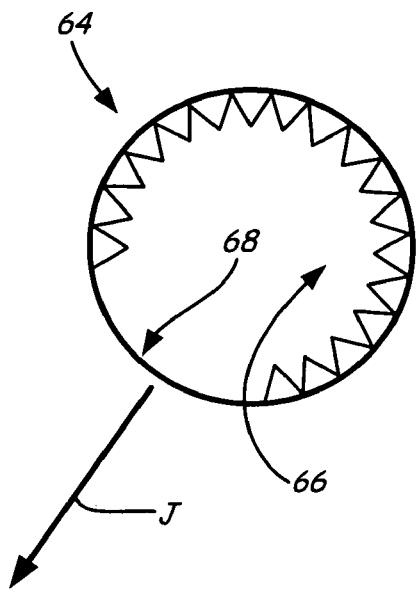
Figure 5B:
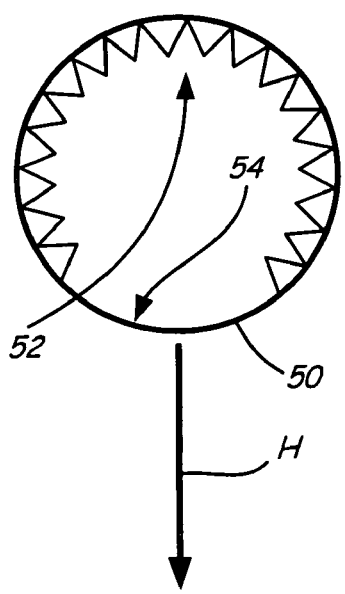
Figure 5C:
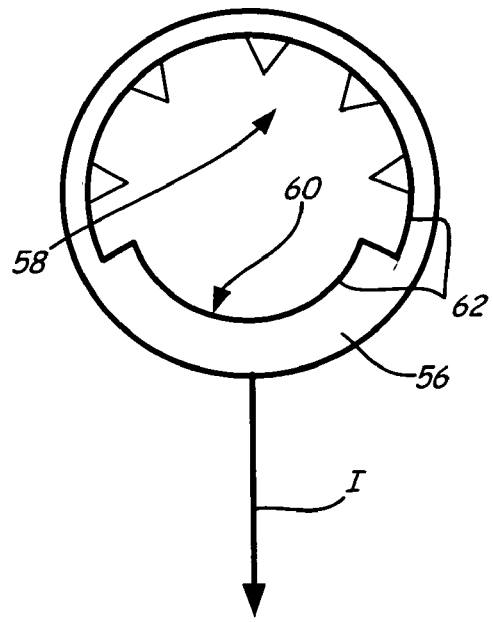

FIGS. 5A-5C show various embodiments of an exhaust nozzle of the present invention. As indicated above, the present invention can be embodied in different configurations of mixing tabs arranged to form both a serrated and non-serrated portion. FIG. 5A shows exhaust nozzle 46 having serrated portion 47 and non-serrated portion 48 oriented such as during typical flight operations including take-off. Serrated portion 47 comprises approximately one half of the trailing edge periphery of nozzle 46, similar to inner nozzle 16 of FIG. 2. Non-serrated portion 48 is positioned along the lower half of nozzle 46, including downward-most or bottom portion, such that a reduction in total perceived noise level occurs in the general downward direction of arrow G. Non-serrated portion 47 typically comprises a portion of the trailing edge of nozzle 46 that is continuously untabbed. In other words, non-serrated portion 47 comprises a segment of the trailing edge that would typically be found along the trailing edge of an exhaust nozzle not having any mixing tabs or serrated portions. Thus, non-serrated portion typically only extends downstream as far as the base of each mixing tab such that the downstream face of the non-serrated portion is approximately coplanar with the upstream base of each mixing tab. Other configurations for the placement of the mixing tabs, such as recessed mixing tabs, may also be used.

Nozzle 46 achieves the reduction in noise in the direction of arrow G in two primary manners. Generally, sound or noise emanating from the mixing of exhaust gases propagates radially outward from engine centerline 48 as the exhaust plume exits nozzle 46. However, as indicated above, noise reduction is most desired in the downward, or ground-ward, direction, the direction in which people will be living or working. Noise propagation in the upward, or skyward, direction is of less concern, although the present invention can be applied to reduce noise production in any direction emanating from the centerline. The present invention reduces the downward propagation of sound by first reducing high-frequency noise generated in the downward direction by eliminating the mixing tabs that produce high-frequency sound along a lower portion of the nozzle. Second, since high-frequency noise is readily attenuated, the resulting lower frequency noise propagating in the downward direction (due to the lack of mixing tabs) shields and attenuates the high-frequency noise generated in the upward direction from propagating in the downward direction. In other words, the downward direction is shielded from the high-frequency noise produced at the top of the nozzle by the exhaust shear layer resulting from an absence of mixing tabs. Thus, non-serrated portion 48 is selectively positioned along the trailing edge of nozzle 46 to reduce perceived noise levels emanating in the downward direction, but can be positioned to reduce noise propagation in any direction from the centerline.

The present invention also achieves additional benefits by having a non-serrated portion along the trailing edge of the exhaust nozzle. For example, since there are fewer mixing tabs in exhaust nozzles having a non-serrated portion, there will be less interference with the exhaust gasses and less associated thrust losses. Likewise, the present invention achieves a reduction in penalties to fuel consumption and thrust losses due to the non-serrated portion of the exhaust nozzle.

FIG. 5B shows exhaust nozzle 50 with serrated portion 52 around approximately seventy-five percent of the trailing edge of nozzle 50. Non-serrated portion 54 is positioned along a lower portion of nozzle 50, including the bottom portion, resulting in a reduction in perceived noise level in the general direction of arrow H. As can be seen from FIG. 5A and FIG. 5B, both nozzles 46 and 50 have non-serrated portions along a lower portion of their respective nozzles. Correspondingly, both nozzles achieve a reduction in perceived noise levels emanating from the bottom of the nozzles, as indicated by arrows G and H. However, with the configuration of nozzle 50, noise will be reduced in a narrower arc emanating from the centerline than nozzle 46 of FIG. 5A.

FIG. 5C shows exhaust nozzle 56 having serrated portion 58 along approximately fifty percent of trailing edge 62. As indicated above, serrations of the present invention may have different configurations, based upon, for example, different requirements for noise reduction and acceptable thrust losses. Thus, serrated portion 58 includes regular intervals between each mixing tab such that a space is between the base of each tab. Non-serrated portion 60 is positioned along a lower portion of nozzle 56 such that a reduction in perceived noise level in the general direction of arrow I is achieved. Thus, nozzle 56 achieves a wide arc of noise reduction similar to nozzle 46 of FIG. 5A. The noise reduction characteristics, however, vary based on the differing mixing tab configurations, specifically the tab spacing. As described above, mixing tabs used in the present invention can be of any suitable design. In one embodiment of nozzle 56, trailing edge 62 of nozzle 56 can be recessed such that the tips of the tabs of serrated portion 58 extend to the trailing edge 62. In other embodiments, other configurations of serrated portion 58 can be used, such as the non-recessed arrangement of FIG. 5A.

FIG. 5D shows the trailing edge of exhaust nozzle 64 having serrated portion 66 along approximately seventy-five percent of the trailing edge. Non-serrated portion 68 is positioned along a lower portion of the trailing edge, away from the bottom, such that noise propagation is reduced in the direction of arrow J. Non-serrated portion 66 is positioned in the lower left quadrant of the trailing edge of nozzle 64 to reduce noise propagation in that direction. Non-serrated portion 66 can be selectively directed along the lower portion to reduce noise in other directions. For example, in other embodiments, non-serrated portion 68 can be positioned in the lower right quadrant. Additionally, the percentage of the trailing edge comprising non-serrated portion 68 can be selectively varied to further control the direction of noise propagation. For example, non-serrated portion 68 can comprise about twenty-five to about fifty percent of the trailing edge.

Although the present invention has been described with reference to preferred embodiments, workers skilled in the art will recognize that changes may be made in form and detail without departing from the spirit and scope of the invention.

The invention claimed is:

1. An exhaust nozzle for use in a gas turbine engine, the exhaust nozzle comprising:
   a flow body for receiving exhaust gas from the turbine engine, the flow body comprising:
      a leading edge for connecting with the gas turbine engine such that the flow body surrounds a centerline of the engine; and
      a trailing edge comprising:
         an annular rim;
         a single continuous serrated portion extending from the annular rim and formed from a plurality of tabs for mixing exhaust gas exiting the flow body with gases passing by an exterior of the flow body; and
         a single continuous non-serrated portion positioned along the annular rim between ends of the serrated portion and located on only a lower portion of the trailing edge with respect to the engine centerline.

2. The exhaust nozzle of claim 1 wherein a downstream face of the non-serrated portion is coplanar with bases of the tabs along the annular rim.

3. The exhaust nozzle of claim 1 wherein the non-serrated portion of the trailing edge comprises about twenty five to about fifty percent of the trailing edge.

4. The exhaust nozzle of claim 3 wherein the serrated portion reduces low frequency noise produced by a mixing of the exhaust gas aft of the exhaust nozzle and the non-serrated portion attenuates high frequency noise of the exhaust gas generated by the serrated portion.

5. The exhaust nozzle of claim 4 wherein the non-serrated portion generates a shear flow such that high frequency noise propagation from the serrated portion is reduced in a direction from the centerline to the non-serrated portion by the shear flow to reduce perceived noise level at a position below the centerline.

6. The exhaust nozzle of claim 5 wherein the serrated portion comprises row of adjoining tabs.

7. The exhaust nozzle of claim 5 wherein the serrated portion comprises a row of equally spaced tabs.

8. An exhaust nozzle for reducing exhaust gas noise in a gas turbine engine, the exhaust nozzle comprising:
   a plurality of tabs equally distributed around a mixing segment of a trailing edge of the exhaust nozzle for reducing low frequency noise produced by exhaust gas mixing; and a continuously untabbed segment of the trailing edge positioned circumferentially adjacent an end tab of the mixing segment for attenuating high frequency noise radiating from the plurality of tabs in a direction of the untabbed segment;

wherein the untabbed segment is selectively oriented to reduce perceived noise levels of targeted persons during operation of the gas turbine engine; wherein the untabbed segment is located on only a lower portion of the trailing edge with respect to the engine centerline.

9. The exhaust nozzle of claim 8 wherein a downstream face of the untabbed segment is coplanar with bases of the tabs along the trailing edge.

10. The exhaust nozzle of claim 8 wherein the untabbed segment of the trailing edge comprises about twenty five to about fifty percent of the trailing edge.

11. The exhaust nozzle of claim 8 wherein the untabbed segment is positioned along a bottom portion of the trailing edge to face away from a mounting pylon.

12. The exhaust nozzle of claim 10 wherein the untabbed segment generates a shear flow for reducing high frequency noise propagation from the plurality of tabs in a direction of the untabbed segment such that total perceived noise level in such direction is reduced.

13. A method for reducing directionally perceived noise from an exhaust nozzle of a gas turbine engine, the method comprising:

mixing exhausted gases of the turbine engine with a plurality of tabs positioned along a mixing segment of a trailing edge of the exhaust nozzle to reduce low frequency noise produced by a shearing of the exhausted gases; and attenuating high frequency noise produced by the tabs with a shear layer in the exhausted gases produced by a continuously untabbed portion of the trailing edge of the exhaust nozzle positioned between end tabs of the mixing segment such that high frequency noise produced by the exhaust gases is reduced in a direction of the continuously untabbed portion; wherein the untabbed segment is located on only a lower portion of the trailing edge with respect to the engine centerline.

14. The exhaust nozzle of claim 2 wherein the annular rim defines an exhaust duct radius from the engine centerline and wherein bases of the non-serrated portion and the serrated portion are spaced radially equally from the engine centerline.

15. The exhaust nozzle of claim 1 wherein a downstream face of the non-serrated portion is extended from the annular rim such that the downstream face is coplanar with tips of the tabs.

16. The method for reducing directionally perceived noise from an exhaust nozzle of a gas turbine engine of claim 13 and further comprising the steps of:

orienting the exhaust nozzle such that the continuously untabbed portion of the trailing edge is aimed away from targeted persons during operation of the gas turbine engine.

17. The method for reducing directionally perceived noise from an exhaust nozzle of a gas turbine engine of claim 16 wherein the targeted persons are terrestrially located.

* * * * *